United States Patent [19]

Linder et al.

[11] Patent Number: 4,584,103

[45] Date of Patent: Apr. 22, 1986

[54] REVERSE OSMOSIS OF ULTRAFILTRATION MODIFIED POLYACRYLONITRILE-CONTAINING MEMBRANE

[75] Inventors: Charles Linder, Rehovot; Mordechai Perry, Petach Tikvah, both of Israel

[73] Assignee: Aligena AG, Basel, Switzerland

[21] Appl. No.: 445,529

[22] Filed: Nov. 30, 1982

Related U.S. Application Data

[63] Continuation of Ser. No. 189,978, Sep. 18, 1980, abandoned.

[30] Foreign Application Priority Data

Sep. 19, 1979 [CH] Switzerland .................. 8461/79

[51] Int. Cl.$^4$ .................. B01D 13/00; B01D 13/04
[52] U.S. Cl. .................. 210/650; 210/654; 210/500.2; 210/506
[58] Field of Search .................. 210/500.1, 500.2, 506, 210/637, 650, 651, 654; 428/220, 411; 55/158; 189/978

[56] References Cited

U.S. PATENT DOCUMENTS

| | | | |
|---|---|---|---|
| 3,228,877 | 1/1966 | Mahon | 210/651 |
| 4,142,020 | 2/1979 | Okamura et al. | 210/500.2 X |
| 4,148,734 | 4/1979 | Hilterhaus et al. | 210/500.2 X |
| 4,177,150 | 12/1979 | Inoue et al. | 210/500.2 |
| 4,259,183 | 3/1981 | Cadotte | 210/500.2 X |

FOREIGN PATENT DOCUMENTS

| | | | |
|---|---|---|---|
| 786960 | 11/1957 | United Kingdom | 210/500.1 |
| 2016301 | 9/1979 | United Kingdom | 210/500.2 |

OTHER PUBLICATIONS

Chemical Abstracts, vol. 83, 1975, p. 55, Abstract No. 207279g, Kamata et al., "Chelate Semipermeable Membranes".

Chemical Abstracts, vol. 83, 1975, Abstract No. 11675p, Kamata et al, "Semipermeable Membrane".

Patent Office Academy Notebook, Topic 7d, Formality Term List, Session No. 38, Oct. 1977, two pages.

*Primary Examiner*—David Sadowski
*Attorney, Agent, or Firm*—Wenderoth, Lind & Ponack

[57] ABSTRACT

Modified, polyacrylonitrile-containing membranes suitable for ultrafiltration are prepared by reacting polyacrylonitrile or copolymers of acrylonitrile and other ethylenically unsaturated monomers with, successively, hydroxylamine, at least difunctional compounds, which act as bridge members, e.g. cyanuric chloride, a polyfunctional oligomer or polymer, e.g. polyethyleneimine, and, finally, a reactive compound containing at least one ionic group, e.g. an anionic reactive azo dye. The latter compound must be able to react with the polyfunctional oligomer or polymer and is required only if the said polymer does not already itself contain ionic groups.

The novel membranes show good mechanical, temperature and pH-stabilities and are suitable, for example, for separating monovalent ions of low ionic weight from polyvalent ions of low or relatively high ionic weight or from monovalent ions of relatively high ionic weight and for separating ionic compounds from non-ionic compounds or from ionic compounds which have a different molecular weight or opposite charge. They can be used for example for separating salts from organic compounds (dyes) or in waste-water treatment.

18 Claims, No Drawings

REVERSE OSMOSIS OF ULTRAFILTRATION MODIFIED POLYACRYLONITRILE-CONTAINING MEMBRANE

This is a continuation of application Ser. No. 189,978 filed Sept. 18, 1980, now abandoned.

The present invention relates to improved semipermeable membranes in diffusion processes such as reverse osmosis (RO) or ultrafiltration (UF). Specifically the invention provides membranes made from chemically modified acrylonitrile polymers showing improved permeability (flux) and rejection characteristics.

RO-membranes are dense membranes with average pore diameters of 1–15 Å, which effectively reject low-molecular salts, such as sodium chloride, and in particular reject these salts to the extent of more than 50% or preferably more than 90%. UF-membranes have relatively large pore diameters and the rejection for the same low-molecular salts is less than 10%. Since these definitions tend to be arbitrary, there can be membranes which have pore diameters which give rise to a rejection of less than 50% and more than 10% for NaCl. Such membranes are classified between the RO-membranes and the UF-membranes.

The membranes according to the invention can be regarded either as UF-membranes and/or as UF/RO-intermediate membranes. They can be symmetrical or asymmetrical. The pore diameter of the membranes before modification as hereinafter described is as a rule 10 to 1000 Å, preferably 10 to 500 Å or 15 to 150 Å.

It is well known that acrylonitrile copolymers are of potential value as raw materials for the production of semipermeable membranes (B.P. 2016301). One drawback of known membranes from acrylonitrile polymers is for example that they show a large flux but simultaneously insufficient solute rejection so that they cannot be used for many technical applications. Another drawback of the polyacrylonitrile membranes is their solubility in organic solvents and compaction under high pressure.

These disadvantages can be overcome by chemically modifying acrylonitrile polymers obtained according to the inventive method described hereinafter.

Thus it is one object of the present invention to provide new porous, modified polyacrylonitrile-containing membranes suitable for ultrafiltration, which comprises (a) a membrane of polyacrylonitrile or copolymers of acrylonitrile and other ethylenically unsaturated monomers, which contain amidoxime groups, through reaction with hydroxylamine, to which, via (b) at least one bridge member, (c) optionally at least one polyfunctional, linear or branched oligomer or polymer is bonded, and the bridge member (b) or the component (c)-if this is present-, is substituted by (d) radicals containing ionisable groups.

The membranes have at the surface pores with a diameter of 10 to 1000 Å, preferably 10 to 500 Å, prior to modification.

Other objects of the present invention are processes for the manufacture of the modified membranes, their use as parts (superficial films on porous supports) of supported membranes, as well as the use of these membranes in fields involving concentration and purification of liquids, e.g. separating salts from organic compounds or purifying waste waters.

These and other objects of the present invention will be apparent from the following detailed description.

The membranes according to the invention are modified, porous, polyacrylonitrile-containing membranes which have dimensions such that they are, for example, permeable to low-molecular salts of monovalent ions but reject polyvalent ions of relatively high and relatively low molecular weight or of high-molecular monovalent ions or non-ionic compounds.

The modification, according to the invention, of the membranes stabilises the latter against possible compaction under high pressures, so that the flux is impaired to a lesser extent and, at the same time, of course, higher working pressures can be employed.

In addition to improving pressure stability, solvent resistance is also improved by the modification procedure of this invention. In both cases of pressure and solvent resistance, the improvement is attributed to crosslinking of the membrane material.

The membranes according to the invention are prepared by chemically modifying (UF or RO/UF)-polyacrylonitrile-containing membranes and a sequence of different chemical reaction steps is necessary for this.

The process for the preparation of the inventive membranes comprises the reaction steps of
(a) reaction with hydroxylamine to form amidoxime groups from nitrile groups in a membrane of polyacrylonitrile or copolymers of acrylonitrole and other ethylenically unsaturated monomers, the membrane having pores with a diameter of 10 to 1000 Å,
(b) reaction with an organic compound which contains at least 2 groups capable of reaction with the amidoxime groups, the procedure being such that after the reaction with components (a) and (b) at least one reactive group is present,
(c) optional reaction with a polyfunctional oligomer or polymer and
(d) reaction with a compound which contains at least one ionic group and at least one group capable of reaction with (c), provided that component (c) itself does not already possess sufficient ionic groups.

During the reaction with hydroxylamine not only amidoxime groups are formed in the acrylonitrile (co)-polymers but there can be formed groups due to hydrolytic reactions or groups obtained by amidoxime interactions.

Using this process it is possible to prepare modified polyacrylonitrile-containing membranes which have pore diameters which embrace a distinctly wider range than has been possible hitherto.

Thus membranes with different pore size distributions and correspondingly different molecular weight cut-offs may be modified to achieve higher rejection to a given solute. For example, two different membranes with rejections of 30% and 80%, respectively to a given solute may be modified by the process of this invention to obtain in both cases a rejection of over 90%.

This is achieved by increasing the ratio of the charges moieties to the nitrile groups of the inventive membranes by introducing a polyfunctional oligomer or polymer, via a bridge member, into the amidoxime group (modified nitrile group) and then providing the oligomer/polymer with charges, either by reaction with a compound containing ionisable (anionic) groups or, for example, by quaternisation of for example amino groups which the oligomer/polymer already contains (formation of cationic groups).

The basic membrane which is used as component (a) and is modified according to the invention as a rule consists of polyacrylonitrile or of acrylonitrile copolymers, in which case the proportion of acrylonitrile units in the copolymer is at least 5, preferably at least 30 and in particular at least 50%. Further suitable polymers (in addition to polyacrylonitrile) are those of alkyl ($C_1$–$C_6$)-acrylonitriles, for example methacrylonitrile or hexylacrylonitrile, arylacrylonitriles, for example phenylacrylonitrile, halogenoacrylonitriles, in which halogen is fluorine, chlorine or bromine, for example α-fluoroacrylonitrile or α-chloroacrylonitrile, and thioacrylonitriles.

Suitable comonomers which can be compolymerised with acrylonitrile are monomers which contain, for example, hydrophobic, hydrophilic, polar or ionic groups, especially, for example, vinyl esters having 2 to 18 carbon atoms in the acid moiety, especially vinyl acetate, vinyl ethers having 3 to 12 carbon atoms, vinylpyridine, vinyl chloride, styrene, butadiene, acrylic acid or methacrylic acid or (meth)acrylates, for examples those having 1 to 4 carbon atoms in the ester moiety. Further suitable monomers are maleic anhydride, 2-aminoethyl methacrylate and allyl compounds, for example allyl alcohol, allyl- or methallyl-sulfonic acid and their salts (alkali metal salts), allyl halides or methallyl halides, allylamines or allyl p-toluenesulfonates. Further suitable compounds are terpolymers, for example of acrylonitrile, styrene and butadiene (ABS polymers), acrylonitrile/vinyl acetate/methylmethacrylate or acrylonitrile/methyl methacrylate/sodium, allylsulfonate, or tetrapolymers based on acrylonitrile. Component (a) can also contain mixtures of the (co)polymers mentioned.

Further membranes which are suitable for the modification according to the present invention are also those in which some of the nitrile groups of the acrylonitrile units have been hydrolysed to carboxyl groups or reduced to amino groups. Furthermore, those membranes in which the comonomers (in addition to the acrylonitrile) are chemically modified are also suitable. However, the membranes should contain at least 5% of nitrile groups, so that the chemical modification according to the invention can be carried out. Membranes to be modified according to the present invention are commercially available or are readily prepared by those skilled in the art. Casting solutions and methodology are known from the patent and technical literature (cf. e.g. GB No. 1 327 990 and GB No. 2 016 301).

Component (b) forms the bridge member between the membrane containing the modified polyacrylonitrile (amidoxime groups) (component a) and the polyfunctional oligomer or polymer (component c). Compounds which can be used as component (b) are monomeric or polymeric compounds which possess crosslinking properties and can enter into chemical bonding both with component (a) and with component (c). These compounds, which have at least two functional groups, possess their reactivity by virtue of for example multiple bonds, epoxide groups, aziridine groups, aldehyde groups, imidate groups, isocyanate or isothiocyanate groups, hydroxyl groups, anhydride groups, acyl halide groups or N-methylol groups (these bonds or groups may be further substituted), or of substituents detachable as tertiary amines or preferably as anions, and combinations of these are also possible. The compounds contain, for example, the groupings

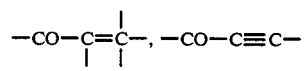

or

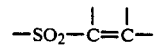

as a multiple bond to which further substituents can be added on. The isocyanate or isothiocyanate group can also be considered as a group of this type. Component (b) can contain quaternary ammonium groups, which are split off as tertiary amines, for example a trimethylammonium or pyridinium group or sulfonium groups, as the leaving groups. However, component (b) preferably contains substituents with groups that split off as an anion, and preferably containing a reactive halogen atom, as the reactive group. These leaving groups possess their reactivity by virtue of, for example, the influence of electrophilic groups, such as the —CO— or —$SO_2$— group in saturated aliphatic radicals. They also possess their reactivity by virtue of the influence of a quaternary nitrogen atom, such as in the group

or in aromatic radicals by virtue of the influence of electrophilic groups in the o- and p-position, for example nitro, hydrocarbon-sulfonyl or hydrocarboncarbonyl groups, or of the bond to a ring carbon atom which is adjacent to a tertiary ring nitrogen atom, as in halogenotriazine or halogenopyrimidine radicals.

Compounds which have proved particularly advantageous as component (b) are cyclic carbonic acid imide-halides and in particular halogeno-diazines or -triazines containing at least two reactive substituents, as well as compounds containing isocyanate or isothiocyanate groups. Tetrachloropyrimidine and in particular cyanuric chloride have proved particularly advantageous.

The cyclic carbon acid imid-halides used here as component (b) are advantageously (A) s-Triazines, containing at least two identical or different halogen atoms bonded to carbon atoms, for example cyanuric chloride, cyanuric fluoride, cyanuric bromide and also primary condensation products of cyanuric fluoride or cyanuric chloride or cyanuric bromide and, for example, water, ammonia, amines, alkanols, alkylmercaptans, phenols or thiophenols;

(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenopyrimidines are 2,4,6-trichloro- and 2,4,5,6-tetrachloro-pyrimidine;

(C) Halogenpyrimidinecarboxylic acid halides, for examples dichloropyrimidine-5- or 6-carboxylic acid chloride;

(D) 2,3-Dihalogeno-quinoxaline-, -quinazoline- or -phthalazine-carboxylic acid halides or -sulfonic acid halides, such as 2,3-dichloroquinoxaline-6-carboxylic acid chloride or -6-sulfonic acid chloride, 2,6-dichloro-quinazoline-6- or -7-carboxylic acid chloride and 1,4-dichlorophthalazine-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzoxazole-5- or 6-carboxylic acid chloride or -5- or -6-sulfonic acid chloride; and (F) Halogeno-6-pyridazonyl-1-alkanoyl halides or 1-benzoyl halides, for example 4,5-dichloro-6-pyridazonyl-1-propionyl chloride or -1-benzoyl chloride.

Further compounds which contain at least two reactive substituents and can be employed as component (b) are, for example, (G) Anhydrides or halides of aliphatic, $\alpha,\beta$-unsaturated mono- or dicarboxylic acids having preferably 3 to 5 carbon atoms, such as maleic anhydride, acryloyl chloride, methacryloyl chloride and propionyl chloride;

(H) Anhydrides or halides of aliphatic mono- or di-carboxylic acids having preferably 3 to 10 carbon atoms, or of aromatic carboxylic acids, containing mobile halogen atoms, for example chloroacetyl chloride, $\beta$-chloropropionyl chloride, $\alpha,\beta$-dibromopropionyl chloride, $\alpha$-chloro- or $\beta$-chloro-acryloyl chloride, chlormaleic anhydride and $\beta$-chloro-crotonoyl chloride, and fluoro-nitro- or chloro-nitro-benzoic acid halides or -sulfonic acid halides in which the fluorine atom or the chlorine atom is in the o-position and/or p-position relative to the nitro group;

(I) Carboxylic acid N-methylolamides or reactive functional derivatives of these methylol compounds. Carboxylic acid N-methylolamides are in particular N-methylol-chloroacetamide, N-methylol-bromoacetamide, N-methylol-$\alpha,\beta$-dichloro- or -dibromo-propionamide, N-methylol-acrylamide and N-methylol-$\alpha$-chloro- or -$\alpha$-bromo-acrylamide. Reactive derivatives of the carboxylic acid N-methylolamides are for example, the corresponding N-chloromethyl- or N-bromomethyl-amides;

(J) Free or etherified N-methylolureas or N-methylolmelamines, for example N,N-dimethylolurea, N,N-dimethylolurea dimethyl ether, N,N'-dimethylolethylene- or -propylene-urea, 4,5-dihydroxy-N,N'-dimethylolethyleneurea or 4,5-dihydroxy-N,N'-dimethylolethyleneurea dimethyl ether and di- to hexamethylolmelamines, trimethylolmelamine dimethyl ether, pentamethylolmelamine di- to -trimethyl ether and hexamethylolmelamine pentamethyl or hexamethyl ether;

(K) Condensation products of dialkylalkanes containing at least one phenolic hydroxyl group and halogenhydrins, for example the diepoxide obtained from 2,2-bis-(4'-hydroxyphenyl)-propane and epichlorohydrin, as well as glycerol triglycidyl ethers and also corresponding diaziridines;

(L) Di-aldehydes, for example glutaraldehyde or adipaldehyde;

(M) Diisocyanoates or Diisocyanates, such as alkylene ($C_2$–$C_4$)diisocyanate, e.g. ethylene diisocyanate, phenylene- or alkyl-($C_1$–$C_4$)-substituted phenylenediisocyanates, e.g. phenylene-1,4-diisocyanate or toluene-2,4-diisocyanate, or phenylene-diisothiocyanates, for example phenylene-1,4-diisothiocyanate; or (N) Further reactive compounds, such as trisacryloyl-hexahydro-s-triazine, epoxides or aziridines.

The components (c) are polyfunctional oligomers or polymers which contain aliphatic or aromatic amino groups, which can be primary, secondary or tertiary amino groups; furthermore, these components can contain hydroxyl or thiol groups. Examples of such polymers are polyethyleneimine, (M.W. 150 to 1,000,000) which can be partially alkylated (methyl iodide) or otherwise modified, polyvinylamine (molecular weight 1000 to 2,000,000), polyvinyl alcohol (molecular weight of 2,000 to 200,000) or partially esterified polyvinyl alcohol, cellulose derivatives, such as ethylcellulose, carboxymethylcellulose, hydroxymethylcellulose and hydroxyethylcellulose, and also polyvinylaniline (molecular weight 200 to 2,000,000), polybenzylamines, polyvinylmercaptan, polymers of 2-hydroxyethyl- or 2-aminoethylmethacrylates and copolymers, block polymers or graft polymers of these monomers and/or polymers and also further monomers and/or polymers, especially those containing ionic groups ($—SO_3^\ominus$, $—COO^\ominus$, $—^\oplus NR_4$). Examples of such polymers are the copolymers of styrenesulfonate (sodium salt)-/vinylaniline, 2-aminoethyl methacrylate/acrylic acid, vinylaniline/vinylbenzyltrimethylammonium chloride or vinylamine/vinylsulfonate.

Preferred components (c) are polyvinyl alcohols, cellulose derivatives, polyvinylamines and polyvinylanilines and preferably polyethyleneimines as well as the examples of the copolymers mentioned before.

In the aforementioned list of components (b) and (c), it is not expected that every compound or radical of (b) will react with every oligomer or polymer under (c). For example, functional groups of compound (c), containing alkyl amines, are generally more reactive to (b) than aromatic amines, or hydroxyl groups. Likewise, polymeric or oligomeric isocyanate or thioisocyanate (c) will not react with identical groups in (b), but must be chosen with such radicals of (b) where a reaction is possible (e.g. methylol or amine or hydroxyl containing radicals of (b) will react with isocyanate functions of (c)).

The ionisable groups are either already attached to the polyfunctional oligomer or polymer (c) or are introduced by means of component (d). The ionisable group is bonded covalently and the counter ion is mobile and replaceable. An anionic bonded group is to be understood as meaning a group in which the negative ion is bonded to the molecule of the membrane and the counter ion is mobile and replaceable. In the case of a cationically ionisable group, the situation is reversed.

Reagents (d) which contain an ionisable group can be colourless or coloured compounds, for example ionic reactive dyes, which can belong to various categories, for example anthraquinone, formacyl or preferably azo dyes which are optionally metal complexes. Reactive groups which enable these reagents to bond to the polymeric (modified) membrane substances are the following: carboxylic acid halide groups, sulfonic acid halide groups, radicals of $\alpha$-bromoacrylic acid or acrylamide radicals of $\alpha,\beta$-unsaturated carboxylic acids or amides, for example of acrylic acid, methacrylic acid, $\alpha$-chloroacrylic acid, $\alpha$-bromoacrylic acid or acrylamide radicals of preferably low halogenalkylcarboxylic acids, for example of chloroacetic acid, α,β-dichloropropionic acid or α,β-dibromopropionic acid; radicals of fluorocyclobutanecarboxylic acids, for example of tri- or tetra-fluorocyclobutanecarboxylic acid; radicals containing vinylacyl groups, for example vinylsulfone groups or carboxyvinyl groups; radicals containing ethylsulfonyl ($-SO_2CH_2CH_2OSO_2OH$, $-SO_2CH_2CH_2Cl$) or ethylamino sulfonyl groups ($-SO_2NHCH_2CH_2OSO_2OH$) and halogenated heterocyclic radicals such as dihaloquinoxalines, dihalopyridazones, dihalophthalizines, halobenzothiazoles and preferably halogenated pyrimidines or 1,3,5-triazines such as monohalotriazines, dihalotriazines, 2,4-dihalopyrimidines or 2,4,6-trihalopyrimidines. Suitable halogen atoms are fluorine, bromine and especially chlorine atoms.

Examples of reactive groups present in component (d) are monochlorotriazinyl, dichlorotriazinyl, 2,4-dichloropyrimidinyl, 2,3-dichloroquinoxaline-6-carbonyl, 4,5-dichloro-pyridazonylpropionyl, 1,4-dichlorophthalazine-6-carbonyl, chlorobenzothiazole linked to the dye via $-CONH$, $-SO_2NH-$, $-NH-Ar-N=N-$ (Ar=phenylene or naphthylene), 5-chloro-4-methyl-2-methylsulphonyl pyrimidinyl, vinylsulphonyl, β-sulphato ethylsulphonyl, β-sulphatoethyl aminosulphonyl, β-chloroethylsulphonyl or β-sulphatopropionamido.

Mostly preferred components (d) are reactive azo dyestuffs containing sulphonic acid ($-SO_3H$) or carboxyl ($-COOH$) groups (either group may be also present in salt form, such as an alkali metal salt (sodium salt) and as reactive groups monochlorotriazinyl, dichlorotriazinyl, 2,4-dichloropyrimidinyl, vinyl sulfonyl, β-sulfatoethylsulfonyl, β-chloroethylsulfonyl or β-sulfatoethylaminosulfonyl radicals.

Ionisable groups which the membrane-modifying substances (or the membranes obtained after modifying) can contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

The membranes which contain at least at the membrane surface an oligomer or polymer (c) modified by an azo dye containing sulfonic acid groups are particularly valuable and versatile in use. The azo dye can also contain a metal, for example copper, bonded as a complex.

Furthermore, it is also possible to introduce the charged groups into the membrane by reacting reagents, such as alkyl halides or benzyl halides, with an amino group of the polymer chain. In this way, for example, the polyethyleneimine radical can be modified by methyl iodide or dimethyl sulfate. On the other hand, the modification can also be effected with chlorosulfonic acid itself.

Preparation of the polyacrylonitrile-containing membranes according to the invention:
(1) Modification of the starting membrane with hydroxylamine and reaction with components (b), (c) and (d).

The porous starting membrane (made of polyacrylonitrile or copolymers of acrylonitrile and ethylenically unsaturated comonomers) is treated for 3 to 60 minutes at temperatures of about 55° to 75° C. with an aqueous solution of hydroxylamine (2 to 15%), which has a pH value of 2 to 11 and preferably of 6 to 7 (for example adjusted with sodium carbonate). The rate of conversion of nitrile to amideoxime groups can be from 0.5 to about 30% and preferably in the range of 1.0 to 4% for example for polymers containing 80% or more of acrylonitrile units. The membrane treated in this way is then removed from the reaction solution and placed in an aqueous solution (suspension) of the (multifunctional) organic compound (b), which, for example, when cyanuric chloride, is used as component (b), can contain 0.5 to 5 parts of cyanuric chloride per part of membrane. The reaction temperature should be kept below 4° C., for example at 0° C., in order to prevent hydrolysis of the cyanuric chloride; the pH value range is approximately between 8 and 11 and the reaction time can be from 20 minutes to 5 hours.

The unconverted reactive groups of component (b) are then further reacted with an aqueous solution of a polyfunctional polymer (oligomer) (c), for example polyethyleneimine or polyvinyl alcohol.

Suitable polyethyleneimines can have, for example, molecular weights of 150 to 1,000,000 (and preferably of 189 to 50,000), the compounds of higher molecular weight (molecular weight above 100,000) being more difficult to handle because of their high viscosity. Polyethyleneimines of low molecular weight, for example tetraethylenepentamine (molecular weight 189) or those with a molecular weight of about 2,000, are also suitable.

The aqueous polyetheneimine-containing solutions can be 0.5 to 40% (for example 20 or 15%) solutions, the reaction times are between 2 minutes and 8 hours, the pH value range is approximately between 8 and 12 and the reaction temperature can be 20° to 40° C. For example, good results are obtained when a 10% solution of polyethyleneimine (molecular weight 30,000) is allowed to act on the membrane for 10 minutes at a pH value of 8.5. Tetraethylenepentamine can be allowed to react for 120 minutes when it is used as a 20% aqueous solution at a pH value of 10.

The reaction with component (d) serves to introduce positive or negative charges (ionic groupings) into the membrane surface and/or the pores and is effected in one or two stages.

The one-stage process means that the compound carrying the charge and the so-called fixing agent (for example alkali) are used in one bath.

The two-stage process comprises first the step involving the adsorption of the compound carrying the charge and then, in a separate reaction solution, the fixing step (chemical reaction between component (d) and the (modified) membrane). The two-stage process is preferred since, on the one hand, the concentration of component (d) in the adsorption solution can be kept lower and a solution of this type can optionally be used several times and, on the other hand, the total reaction time is shorter than in the case of the one-stage process.

In the two-stage process, the concentration of a reactive dye (component (d)) in aqueous solution can be about 0.5 to 3%; the adsorption is carried out, for example, at temperatures of 20° to 35° C. over a period of 2 to 60 minutes; the pH value can be 4 to 8. Fixing can then be carried out in an aqueous solution, the pH of which has been adjusted to 9 to 12, and the reaction time can be about 30 minutes. The pH is adjusted to the desired value using any desired inorganic (sodium carbonate) or organic bases.

The reaction of component (b) (for example cyanuric chloride) with the reactive amidoxime groups of the membrane modified according to reaction step (a) can easily result in excessive crosslinking and thus in hard or brittle membranes.

However, a certain degree of crosslinking is desired in order, for example, to improve the stability of the membrane towards high pressure and organic solvents. In a variant of the modification process (1) it is therefore also possible to hydrolyse or to mask some of the reactive amidoxime groups (for example by reaction with monofunctional compounds or compounds competing with the amidoxime groups for component (b)).

(2) Modification of the starting membrane with hydroxylamine and reaction with components (b) and (c):

The modification of the starting membrane up to and including the reaction with component (b) is carried out as described under (1).

An oligomer or polymer which, in addition to reactive groupings, also carries ionic groups (positive or negative charges) is used as component (c). A compound suitable as component (c) is, for example, a copolymer of vinylaniline and styrenesulfonate or preferably a copolymer of vinylamine and vinyl sulfonate which contains the following recurring units:

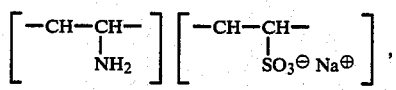

the ratio of which can vary between 70:30 and 30:70.

The molecular weights of the copolymers are about 5,000 to 1,000,000. Components (b) (cyanuric chloride) can react with the amino group.

Further homopolymers and copolymers can be used. Polyethyleneimine can be used to form positively charged membranes by acidifying the modified membrane after the reaction of the polyethyeneimine (as the base).

The reaction of component (c) with the reactive groups of component (b) results in crosslinking and thus in stabilisation of the membrane. In an alternative modification route components (c) can be used which do not contain ionic groups.

(3) Modification of the starting membrane with hydroxylamine and reaction with components (b) and (d):

The reaction conditions are the same as those indicated under (1); component (c) is not used. Component (b) is responsible for crosslinking and component (d) is responsible for the introduction of the ionic groups.

(4) Modification of the starting membrane with hydroxylamine and reaction with component (d).

If the reaction of the membrane with hydroxylamine is carried out under conditions which are at the upper limit of the conditions indicated under (1), i.e. for example, at temperatures of 70° to 75° C. and using a reaction solution which contains 10% of hydroxylamine and 7.5% of sodium carbonate, a membrane is obtained which has distinctly improved rejection characteristics. The membrane thus obtained can then be reacted direct with component (d) in order to introduce ionic groups.

(5) Membranes with equivalent flux and rejection performance can be manufactured if the acrylonitrile polymers are first modified with hydroxylamine or with hydroxylamine and component (b) (e.g. cyanuric chloride) and then cast to a membrane which is then modified with components (b), (c) and (d), depending on the components used in the pre-cast modification.

The various processes described hereinbefore are suitable to prepare self-supporting and supported membranes.

The acrylonitrile units containing polymers modified with hydroxylamine or hydroxylamine and (b) can further be cast as film on porous support and are then modified with (b) or (c) and (d) in order to form a supported membrane.

The self-supporting membranes obtained according to method (5) and the supported membranes as well as their processes for the manufacture are further objects of the present invention.

The pre-cast modification process comprises reacting polyacrylonitrile or copolymers of acrylonitrile and other ethylenically unsaturated monomer with hydroxylamine or with hydroxylamine and component (b). These modified polymers are then used for casting a membrane and modifying this membrane by reacting it with components (b), (c) and (d) (depending on the pre-cast steps), with the proviso that the reaction with (d) is only carried out if component (c) itself does not already possess sufficient ionic groups.

The process for manufacturing a supported semipermeable membrane for ultrafiltration comprises casting on one surface of a porous support an organic casting solution of a polyacrylonitrile or a copolymer of acrylonitrile and other ethylenically unsaturated monomers modified with hydroxylamine or with hydroxylamine and (b) a compound which contains at least two groups capable of reaction with amidoxime groups obtained by reaction of nitrilo groups with membrane (a), treating the wet membrane in water, and modifying the membrane by reacting it with components (b), optionally (c), and (d) or optionally (c) and (d), with the proviso that step (d) is only carried out if component (c) itself does not already possess sufficient ionic groups. Components (b), (c) and (d) have the meanings assigned to them hereinbefore.

The casting solution (as mentioned before) can further be applied to a substrate from which the membranes prepared according to this invention may be removed. Such substrates are for example glass or stainless steel and the obtained membranes are self-supporting ones.

By the pre-cast modification of the acrylonitrile units containing polymers with hydroxylamine or hydroxylamine and component (b), several advantages can be reached: Less hydroxylamine and cyanuric chloride (component (b)) are needed if these modification steps are carried out in the casting solution. For example, the modification of 1 m² of pre-existing membrane requires 100 g vs. 6 grams of the reagent before casting a membrane.

The amidoxime modification of preformed membranes requires careful control of the temperature and time of reaction and the adoption of these variables to the initial porosity and material constituent of the membrane to be modified. In the new method, it is much easier to control the step of amidoxime modification, and is independent of any membrane characteristics as this is controlled by subsequent membrane casting techniques.

For the case of modification of the nitrile to amidoxime groups in the casting solution, the conversion may be between 5 and 100%, with the preferred range of 20-80%. The concentration of the (un)modified polymers in the casting solution may be in the range of from 5 to 50%, preferably 10 to 25%, by weight.

The function of the porous support is to impart mechanical strength to a mechanically weak membrane which controls the flux and rejection properties of the composite system. Suitable support materials are water-insoluble and may be chosen from polyacrylonitriles, polysulfones, polyamides, polyolefines such as polyethylenes or polypropylenes, polyester (non-wovens) or cellulosics. The thickness of the support may be in the range of 20 microns to 2 mm.

The process for manufacturing the inventive supported membranes comprises casting on one surface of a porous support, an organic (dimethylformamide, N,N-dimethylacetamide, N-methylpyrrolidone) casting solution of a polyacrylonitrile or an acrylonitrile copolymer modified by hydroxylamine or hydroxylamine and component (b) and immersing the obtained wet film in water of ambient (room) temperature or in ice water, optionally in the presence of additives such as surfactants or organic solvents. The time between casting and the said immersion may vary from 0 to 24 hours without the application of heat or vacuum.

Optionally the casting solution may contain such additives that are known to influence final membrane porosity and mechanical stability for example cosolvents and inorganic and organic salts.

For practical purposes the thickness of the wet film layer should be in a range of 0.05 to 2 mm preferably between 0.1 and 0.4 mm. Thinner or thicker films are also possible.

The obtained membranes are then further modified as indicated before by reaction with components (b), (c) and (d), depending on the pre-cast modification.

Compared with known modified membranes, the inventive membranes show the following advantages:
1. Improved rejection for charged ionic substances, especially ionic substances having a multiple charge, in an aqueous solution.
2. An increase in the difference between the rejection for ions with a multiple charge and the rejection for monovalent ions in aqueous solutions.
3. An improvement in the efficiency of the separation (concentration) of charged ions, especially ions having a multiple charge, from the solvent (water).
4. An improvement in the efficiency when separating dissolved substances with a multiple charge from dissolved substances with a single charge.
5. An improvement in the efficiency of the separation of low-molecular dissolved substances from high-molecular dissolved substances, both the low-molecular and the high-molecular substances being monovalent and having the same charge (positive or negative).
6. Possibility for use at pH values of about 2 to 10 and temperatures of up to 70° C. (cellulosic membranes cannot be used in these wide ranges).
7. Improvement in solvent resistance to the extent that the membrane is no longer soluble in the solvents of polyacrylonitrile (e.g. N,N-dimethyl-formamide).
8. Improved resistance to high pressure (good stability). Pressures between about 2 and 40 bars, preferably 2 and 30 bars.

The following applications in particular are advantageous for the membranes according to the invention and, in principle, these applications always concern the separation of monovalent ions of low ionic weight from polyvalent ions of low or relatively high ionic weight or from monovalent ions of relatively high ionic weight, or the separation of ionic substances from non-ionic substances or of ionic compounds of different molecular weights or of opposite charge.

1. The separation of organic and metal-organic ionic substances from by-products from a reaction mixture and other substance which are contained therein, for example from salts, such as sodium chloride, sodium sulfate or sodium acetate.
2. The separation of heavy metal complexes from those salts which do not form complexes (treatment of effluents).
3. The purification of effluents which are obtained from the production and use of dyes and fluorescent brighteners.
4. The separation of proteins or hormones which have similar molecular weights but are of opposite charge.
5. The separation of ionic surfactants (detergents, wetting agents or dispersants) from other chemicals which are still present in the reaction mixture after the preparation of the surfactants (by-products, excess starting materials).
6. The removal of ionic surfactants from effluents.
7. The separation of ionic molecules (salts) from aqueous solution, i.e. the concentration of aqueous solutions which contain metal complexes, surfactants, dyes or proteins, the results obtained in this case being better, with regard to the efficiency (permeability (flux) per unit time) and the separating effect, than those obtained with known membranes.
8. The separation of compounds of opposite charge.
9. The separation of charged compounds from compounds with no charge.

Depending on the intended application, the membranes can be in various forms for example in the form of sheets, leaves or tubes or in the form of a pocket, bag, cone or of hollow fibres. When subjected to severe pressure, the membranes can, of course, be protected by non-woven supports, supports made of textile fibres or paper, wire screens or perforated plates and tubes (modules). Within the range indicated further above, the pore size can be varied by annealing and can likewise be suited to the particular application.

Thus, for example, by subjecting the membranes to heat treatment before or after their chemical modification it is possible to change the pore size and thus the flux and the rejection of the membranes. The average charge density (i.e. the content of ionisable groups) of the membrane is advantageously 1 to 1,000 miliequivalents and preferably 10 to 500 miliequivalents per kilogramm of dry membrane.

The separation effect (the rejection) of the membranes can be measured as follows: a circular membrane with a surface area of 13 cm$^2$, resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to a pressure of 14 bars. The solution is stirred magnetically. The liquid which collects on the outlet side of the membrane is examined to determine its content (concentration) $c_2$ of the substance to be tested, 3 5 ml samples being taken from the start of the experiment. In general, the amount which flows through the membrane and the composition of the 3 samples are constant. The rejection can be calculated from the values obtained, using the equation $$R = \frac{c_1 - c_2}{c_1} \cdot 100 \, (\%)$$

The amount of material passed through the membrane per surface and time unit is found to be $$F = V \cdot S^{-1} \cdot t^{-1}$$

V: volume
S: membrane surface area
t: time

F is appropriately expressed in $m^3 \cdot m^{-2} \cdot d^{-1}$, i.e. the number of cubic meters per square meter surface area of the membrane and per day, or in $1 \, m^{-2} h^{-1}$, i.e. liters per square meter surface area of the membrane and per hour.

In addition to the measurements on flat membranes, measurements on tubular membranes 60 cm long and with an outer diameter of 1.4 cm are also carried out when explicity stated in the following examples. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent flow, under 20 bars pressure. The flow rate is kept constant at 10–15 liters per minute. The rejection (R) and the flux (F) are calculated in the same way as for the flat membranes.

In the following examples, the dyes and colourless compounds of formulae (5) to (9) and (12) to (18) are used as component (d) while the dyes of formulae (1) to (4), (10) and (11) are used in test solutions.

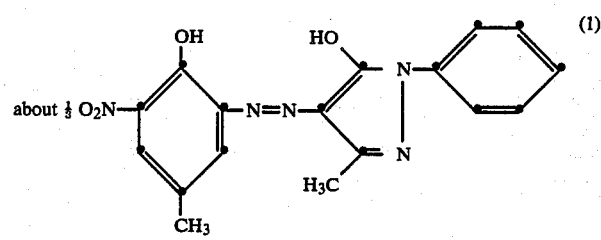

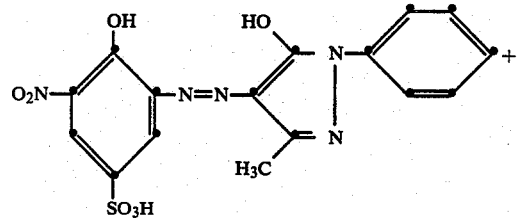

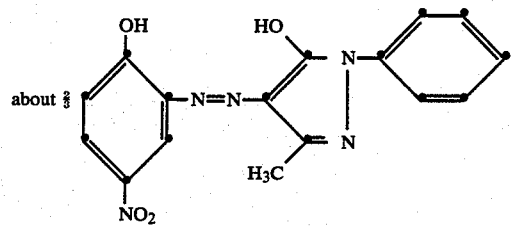

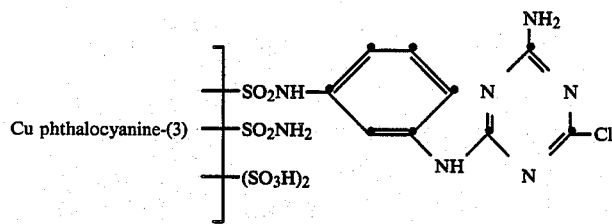

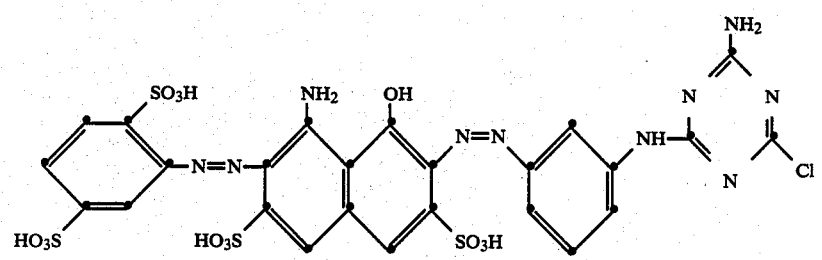

-continued
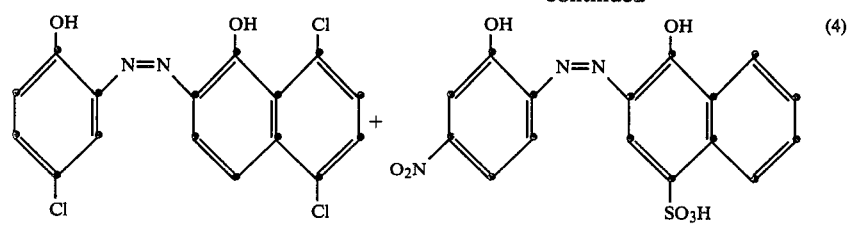
1:2 Cr complex
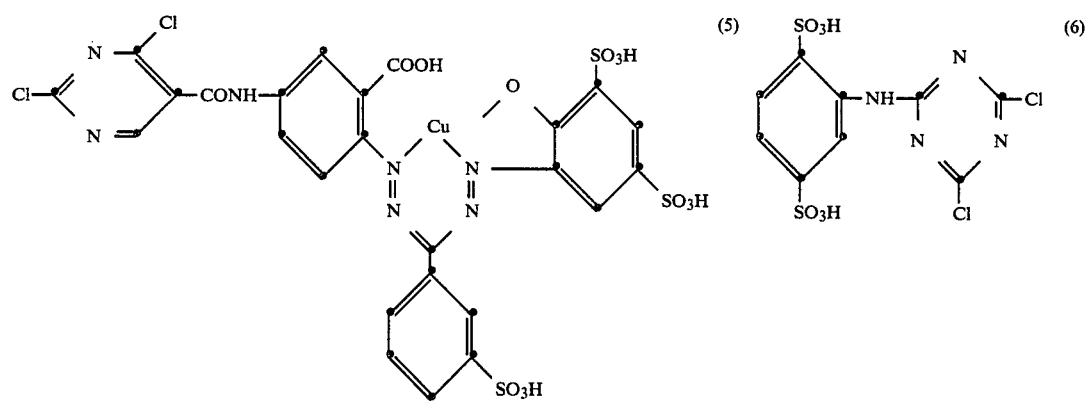
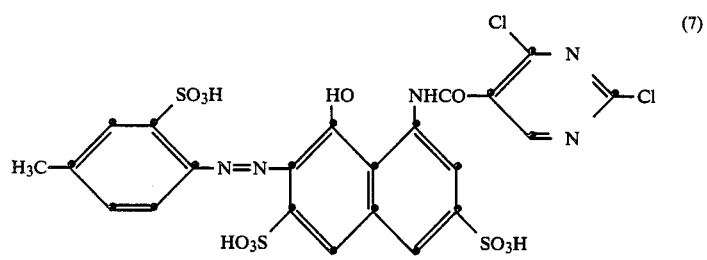
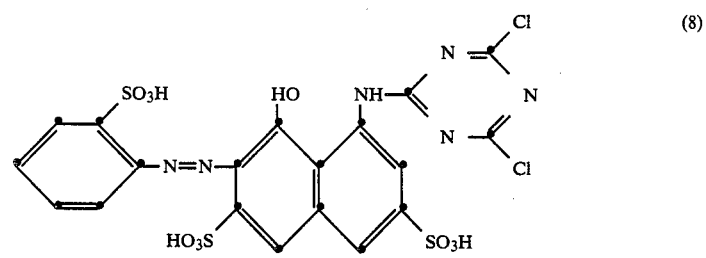
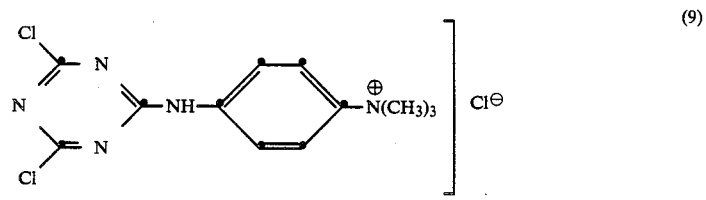
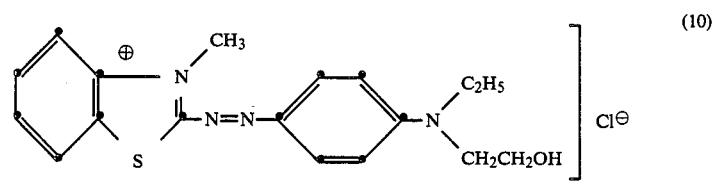

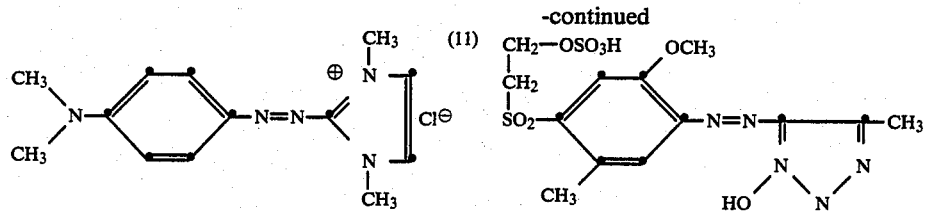 (11)
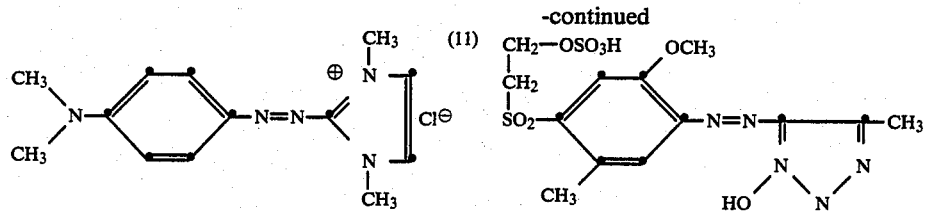 (12)
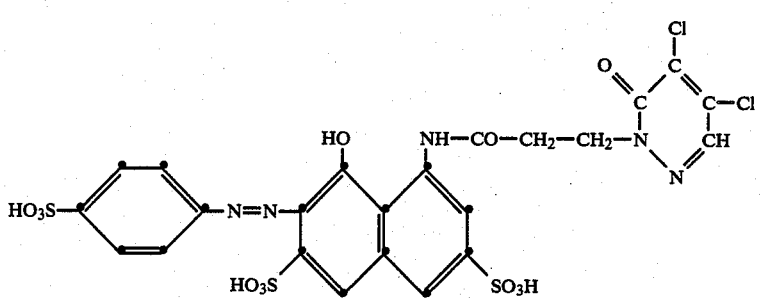 (13)
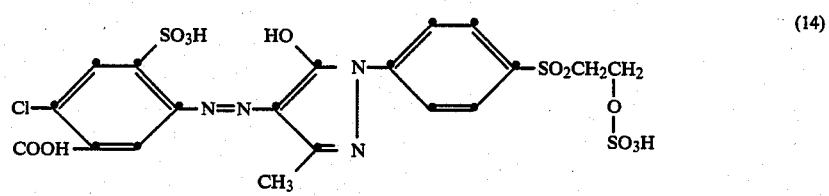 (14)
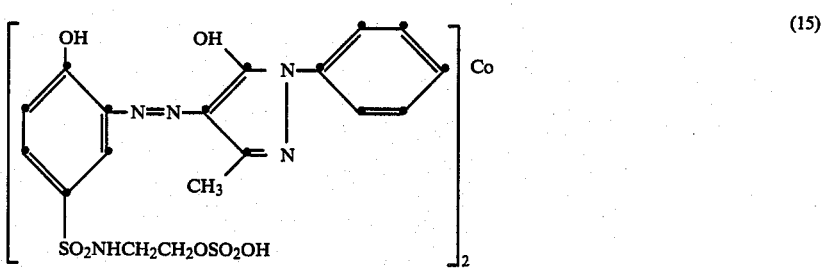 (15)
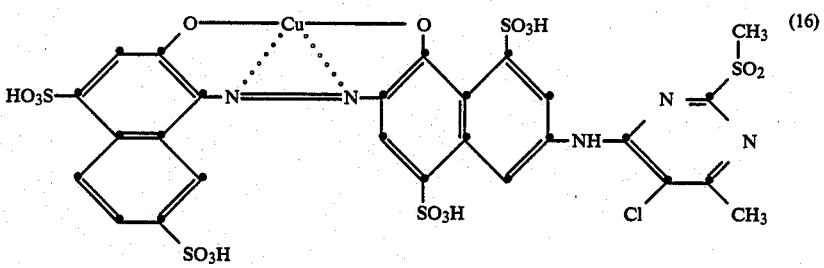 (16)
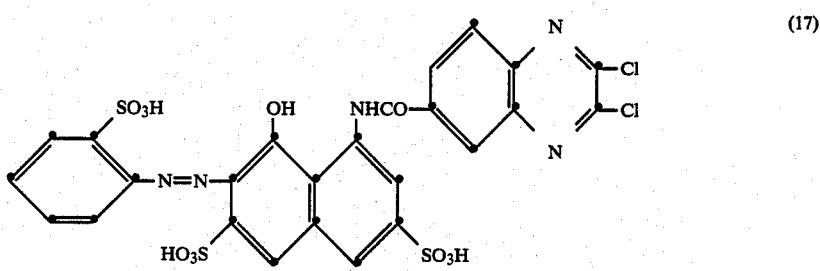 (17)

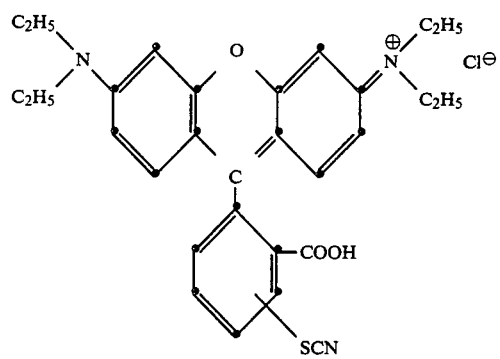

(18)

In the following examples, parts and percentages are by weight.

EXAMPLE 1

A membrane with a maximum pore size of 115 Å which consists of an 85:15 acrylonitrile/vinyl acetate copolymer being suitable for ultrafiltration and having the following rejection:

| | |
|---|---|
| 2% sodium chloride solution | 6% |
| 1% sodium sulfate solution | 10% |
| Dextrin (molecular weight 70,000) | 60% |
| 1% solution of the dye of the formula (3) | 34% | is treated for 5 minutes at 65° C. with an aqueous solution which contains 10% of hydroxylamine and 7.5% of sodium carbonate and has a pH value of 6.5. The membrane is then removed from the solution and placed in a stirred solution of 370 mg of cyanuric chloride per 100 mg of membrane. For a period of 30 minutes and at 0° C., this solution is kept at a pH value of 10 by the addition of 1N sodium hydroxide solution. The membrane is removed from this solution, washed with ice-water and placed in a stirred 10% solution of polyethyleneimine (molecular weight 40,000) and kept in this solution for 5 minutes at room temperature and a pH value of 10. The membrane is removed again and brought into contact with a solution which contains 4% of the dye of the formula (5) and 10% of sodium chloride and is kept in this solution for 15 minutes at room temperature. The membrane is then placed in a 5% solution of sodium carbonate and kept in this solution for 30 minutes at room temperature. After this treatment, the flux and the rejection of the membrane are measured for various dyes, salts and complexes. The results are listed in the following tables.

TABLE 1

| Compounds | Concentration in % | Rejection in % Flat membrane | Rejection in % Tubular membrane | Flux in l/m²·h Flat membrane | Flux in l/m²·h Tubular membrane |
|---|---|---|---|---|---|
| Dye of the formula (3) | 0.1 | 99.3 | 98.6 | 62 | 65 |
| Dye of the formula (3) | 2.0 | 99.6 | 99.4 | 45 | 51 |
| Dye of the formula (3) | 10.0 | — | 99.1 | — | 32 |
| Dye of the formula (4) | 0.3 | 98.6 | 99.5 | 42 | 51 |
| Dye of the formula (4) | 6.0 | 99 | 99.5 | 30 | 40 |
| Dye of the formula (4) | 15.0 | — | 99.8 | — | 24 |
| Sodium chloride | 2.0 | 16 | 17 | 85 | 80 |
| Sodium sulfate | 0.8 | 73 | 62 | 59 | 64 |
| Sodium dodecyl sulfate | 0.05 | 80 | 84 | 63 | 61 |

TABLE 1-continued

| Compounds | Concentration in % | Rejection in % Flat membrane | Rejection in % Tubular membrane | Flux in l/m²·h Flat membrane | Flux in l/m²·h Tubular membrane |
|---|---|---|---|---|---|
| Mercury complex of ethylenediaminetetraacetic acid (calculated as Hg) | 0.01 | 99.0 | — | 50 | — |
| Dye of the formula (1) | 0.5 | 99.6 | — | 45 | — |

When the membranes are in operation for 100 hours, the flux of the 0.1% solution of the dye of the formula (3) falls from 62 l/m²/h to 54 l/m².h. With a conventional polyacrylonitrile membrane, the flux falls from 100 to 40 l/m².h when the membrane is in operation for 100 hours. The rejection of the membrane according to the invention changes only slightly when it is in operation for 100 hours. This is clearly illustrated in the following table on the example of a 1.5% solution of the dye of the formula (3) at various pH values.

TABLE 2

| pH value | Rejection (%) At the start | Rejection (%) After 100 hours |
|---|---|---|
| 3.0 | 98.6 | 99.0 |
| 7.0 | 99.6 | 99.8 |
| 10.0 | 99.5 | 99.4 |

The membranes disclosed in the following examples also display similar properties.

EXAMPLE 2

The procedure for the preparation of the membrane is the same as that in Example 1, except that the treatment is carried out with a 20% solution of a polyethyleneimine with a molecular weight of 189 for 2 hours instead of with the solution of a polyethyleneimine with a molecular weight of 40,000 (for 5 minutes). The results of the test can be seen from Table 3 below.

TABLE 3

| Compounds | Concentration in % | Rejection in % Flat membrane | Rejection in % Tubular membrane | Flux in l/m²·h Flat membrane | Flux in l/m²·h Tubular membrane |
|---|---|---|---|---|---|
| Dye of the formula (1) | 5.0 | 94 | 98 | 45 | 50 |
| Dye of the formula (1) | 1.0 | 98 | 97.5 | 50 | 56 |
| Dye of the formula (2) | 1.0 | 97 | 97 | 60 | 61 |

TABLE 3-continued

| Compounds | Concentration in % | Rejection in % | | Flux in l/m²·h | |
|---|---|---|---|---|---|
| | | Flat membrane | Tubular membrane | Flat membrane | Tubular membrane |
| NaCl | 2.0 | 7.0 | 6.0 | 50 | 60 |
| Na₂SO₄ | 1.0 | 50 | 54 | 55 | 49 |
| KCl | 1.5 | 8.0 | 9.0 | 50 | 60 |

The charge with ionic groups has a great influence on the rejection of the membranes. Whilst the membrane according to this example has a rejection of 98% for an 8% solution of the dye of the formula (3), this rejection falls to 89% in the case of the corresponding membrane which has no charge (has not been reacted with reactive dye).

EXAMPLE 3

The procedure is as indicated in Example 1, except that a polyethyleneimine with a molecular weight of 2,000 is used and the treatment is carried out with a 10% solution of this polyethyleneimine for 20 minutes at room temperature. The characteristics of this membrane are given in Table 4 below:

TABLE 4

| Compounds | Concentration in % | Rejection in % | | Flux in l/m²·h | |
|---|---|---|---|---|---|
| | | Flat membrane | Tubular membrane | Flat membrane | Tubular membrane |
| Dye of the formula (1) | 5.0 | 99.1 | 99.8 | 40 | 45 |
| Dye of the formula (3) | 1.0 | 99.9 | 98.2 | 60 | 62 |
| Dye of the formula (4) | 1.0 | 97.9 | 99.5 | 54 | 58 |
| NaCl | 2.0 | 12 | — | 80 | — |
| Na₂SO₄ | 1.0 | 65 | — | 69 | — |
| Co—citrate | 0.02 | 97 | — | 85 | — |

EXAMPLE 4

The procedure is as indicated in Example 2, except that a polyvinyl alcohol with a molecular weight of 14,000 is used in place of the polyethyleneimine. The effects of a flat membrane of this type are shown in Table 5 below.

TABLE 5

| Compounds | Concentration in % | Rejection in % | Flux in l/m²·h |
|---|---|---|---|
| Dye of the formula (3) | 1.5 | 97 | 32 |
| Dye of the formula (4) | 1.5 | 98 | 36 |
| Sodium chloride | 2.0 | 8.0 | 45 |
| Sodium sulfate | 1.0 | 52 | 40 |

EXAMPLE 5

The procedure is as indicated in Example 2, except that a polyvinyl alcohol with a molecular weight of 150,000 is used in the form of a 2.5% solution. The rejection for a 1.5% solution of the dye of the formula (3) is 96% and the flux is 55 l/m²·h.

EXAMPLE 6

The procedure is as indicated in Example 1, except that, in place of the polyethyleneimine, a 5% (0.5–20%) solution of polyvinylaniline with a molecular weight of 25,000 and a pH value of 2.0 (1 to 3) is used. The treatment with the polyvinylaniline takes 5 minutes. The membrane is then allowed to dry for 5 minutes and is then washed for 10 minutes in a bath which has a pH value of 10. The subsequent charging with ionic groups is effected as indicated in Example 1 (pH value: 9–12, adsorption time: 20 minutes to 3 hours). The characteristics of the flat membranes are given in Table 6 below.

TABLE 6

| Compounds | Concentration in % | Rejection in % | Flux in l/m²·h |
|---|---|---|---|
| Dye of the formula (3) | 1.5 | 98 | 30 |
| Dye of the formula (4) | 1.5 | 99 | 35 |
| Sodium chloride | 2.0 | 12 | 40 |

EXAMPLE 7

A membrane is prepared in the same way as indicated in Example 1, except that the reactive dye of the formula (5) is replaced by the reactive dye of the formula (7) and that the membrane is kept in the dye solution for only 5 minutes instead of for 15 minutes, before it is immersed in a sodium carbonate solution for 30 minutes. The characteristics of a flat membrane are given in Table 7 below.

TABLE 7

| Compounds | Concentration in % | Rejection in % | Flux in l/m²·h |
|---|---|---|---|
| Dye of the formula (1) | 2.0 | 99.9 | 41 |
| Dye of the formula (3) | 2.0 | 99.4 | 33 |
| Sodium chloride | 2.0 | 9.0 | 60 |

EXAMPLE 8

A membrane is prepared in the same way as indicated in Example 1, except that a reactive dye of the formula (8) is used in place of the reactive dye of the formula (5). The characteristics for a flat membrane are given in Table 8 below.

TABLE 8

| Compounds | Concentration in % | Rejection in % | Flux in l/m²·h |
|---|---|---|---|
| Dye of the formula (3) | 1.5 | 98.9 | 40 |
| Sodium chloride | 2.0 | 11.0 | 49 |

EXAMPLE 9

A membrane is prepared in the same way as indicated in Example 1, except that the reactive dye of the formula (5) is replaced by the negatively charged compound of the formula (6). The characteristics of the membrane are given in Table 9 below.

TABLE 9

| Compounds | Concentration in % | Rejection in % | Flux in l/m²·h |
|---|---|---|---|
| Dye of the formula (1) | 2.0 | 99.9 | 41 |
| Dye of the formula (3) | 2.0 | 99.4 | 33 |
| Sodium chloride | 2.0 | 9 | 55 |

EXAMPLE 10

The procedure employed for the preparation of the membrane is the same as that indicated in Example 1, except that the reactive dye of the formula (5), which contains a negatively charged sulfo group, is replaced by the positively charged reactive compound of the formula (9). This membrane, which is permanently positively charged with a quaternary ammonium radical, is now tested with a positively charged dye and compared with an unmodified membrane. The results for flat membranes are summarised in Table 10 below.

TABLE 10

| Compounds | Concentration in % | Rejection in % Modified | Rejection in % Unmodified | Flux in l/m²·h Modified | Flux in l/m²·h Unmodified |
|---|---|---|---|---|---|
| Dye of the formula (10) | 1.5 | 99.2 | 50.0 | 72 | 130 |
| Sodium chloride | 2.0 | 23 | 1.2 | 90 | 340 |
| Calcium chloride | 1.0 | 93 | 40 | 81 | 120 |

EXAMPLE 11

A membrane is modified in the same way as in Example 2, except that, after the reaction with polyethyleneimine (molecular weight 189), the membrane is immersed for 1 hour in a solution of sodium carbonate in order to bring the pH value to 10.0. The membrane is then placed for 2 (1–4) hours in a petroleum ether solution at 30 (20°–40)° C., which contains 2% of methyl iodide and 2% of sodium bicarbonate (in suspension), and quaternisation of the amino groups of the polyethyleneimine radical is effected in this way. For the dye of the formula (10) (2% solution), the flux thus obtained in 32 l/m².h and the rejection is 99.8%.

EXAMPLE 12

A membrane is prepared in the same way as described in Example 2. However, a 10% (1 to 20%) aqueous solution of the sodium salt of a copolymer of styrenesulfonic acid and vinylaniline in a molar ratio of 70:30 (molecular weight 10,000) is used in place of polyethyleneimine. Since the membrane now already contains negatively charged sulfonic acid groups, further reaction with compounds containing ionisable groups is no longer necessary.

For the dye of the formula (3) (6% solution), the flux is 40 l/m².h and the rejection is 94%.

EXAMPLE 13

The procedure is as indicated in Example 1, except that tetrachloropyrimidine is used in place of cyanuric chloride; in this case, however, the following chemical reaction conditions are also advantageous: the reaction of the tetrachloropyrimidine with the amidoxime groups can be carried out at 10° to 25° C. and the subsequent reaction with the polymer can be carried out at temperatures of 35° to 60° C. The characteristics of a membrane of this type (reaction with tetrachloropyrimidine at 25° C. and with the polymer at 40° C.) are summarised in Table 11 below.

TABLE 11

| Compounds | Concentration in % | Rejection in % | Flux in l/m²·h |
|---|---|---|---|
| Dye of the formula (3) | 0.5 | 99.6 | 76 |
| Sodium chloride | 2.0 | 18 | 91.0 |

When the membrane thus obtained is treated for 1,000 hours in an aqueous solution with a pH value of 10, the rejection is 99.2% and the flux is 85 l/m².h.

EXAMPLE 14

The procedure is as indicated in Example 1, except that the treatment is carried out for 1 (½ to 2 hours) hour with a 10% (1 to 15%) solution of glutaraldehyde at 20° C. (20° to 35° C.) and a pH value of 6 (5.0–7.5), instead of with cyanuric chloride. For a 2% solution of the dye of the formula (3), the resulting membrane has a rejection of 98%, and the flux is 64 l/m².h; for a 2% sodium chloride solution, the corresponding values are 13% and 92 l/m².h.

EXAMPLE 15

(a) A polyacrylonitrile membrane according to Example 1 is treated with hydroxylamine (aqueous solution, which contains 10% of $NH_2OH$ and 7.5% of sodium carbonate) for 7 to 8 minutes at 71° to 72° C. (or for 8 minutes at 73° to 74° C. or for 12 minutes at 70° to 71° C.). The membrane is then reacted direct with the dye of the formula (5) (as indicated in Example 1). The resulting membrane is more elastic than the starting membrane. The values for the flux and for the rejection of the membrane thus obtained are given in Table 12 below.

TABLE 12

| Compounds | Concentration in % | Rejection in % | Flux in l/m²·h |
|---|---|---|---|
| Dye of the formula (3) | 10 | 99.8 | 15 |
| Dye of the formula (1) | 19 | 99.9 | 20 |
| Sodium chloride | 2 | 8.0 | 43 |
| Sodium sulfate | 1 | 71.0 | 26 |
| 4-Nitrotoluene-2-sulfonic acid | 2 | 87 | 80 |

(b) As in (a), but using the dye of formula (18) instead of the dye of formula (5). The resultant membrane's flux and rejection to the dyestuff of formula (3) are 25 l/m².h and 99.5% respectively.

EXAMPLE 16

The procedure is as in Example 15, except that, after the reaction with the hydroxylamine, the membrane is reacted with 50 g (10 to 100 g) of cyanuric chloride per 100 g of membrane at 0° C. for 15 minutes. A membrane with improved rigidity and greater stability towards higher pressures is obtained. For a 10% solution of the dye of the formula (3), the rejection and the flux are 98% and 18 l/m².h, respectively.

EXAMPLE 17

A UF membrane having a pore size of 78 Å of an acrylonitrile/styrene (80/20) copolymer which has a rejection for sodium chloride of 12%, for sodium sulfate of 34% and for the dye of the formula (3) of 50% is modified in accordance with Example 2. The values for the flux and for the rejection of the membrane thus obtained are given in Table 13 below.

TABLE 13

| Compounds | Concentration in % | Rejection in % | Flux in $l/m^2 \cdot h$ |
| --- | --- | --- | --- |
| Dye of the formula (3) | 1.5 | 98.6 | 28 |
| Sodium chloride | 2.0 | 18.0 | 41 |
| Sodium sulfate | 0.5 | 56.0 | 35 |

EXAMPLE 18

A tubular membrane according to Example 15 (a) is tested with the dye of the formula (11) under a pressure of 25 bars. When the concentration of the dye solution is 19%, a rejection of 98% is obtained, the flux being 17 $l/m^2.h$, and when the concentration of the dye solution is 32%, a rejection of 99.0% is obtained, the flux being 14 $l/m^2.h$.

This example shows that positively charged compounds (dye of the formula (11)) can also be rejected by a negatively charged membrane. The dye of the formula (11) has a molecular weight of 306 and is rejected by the membrane according to Example 15 to the extent of more than 98% and can thus, for example, be separated from sodium chloride (desalinated).

EXAMPLE 19

A membrane of acrylonitrile/sodium methallylsulfonate (88/12) which has a pore size of 60 Å has a rejection of 65% for the dye of the formula (3) (0.5% solution) and the flux is 251 $l/m^2.h$. If this membrane is subjected to chemical modification according to Example 1, the rejection for the same dye is 99.9%, and the flux is 100 $l/m^2.h$.

EXAMPLE 20

(a) 15 grams of an acrylonitrile/vinyl acetate (97:3) copolymer is dissolved in dimethyl formamide, filtered through a paper filter, degassed and cast (0.2 mm wet film thickness) on a sheet of polyester non-woven material. Immediately after casting the wet film (on support) is immersed in a bath of water at ambient conditions, resulting in a water-insoluble ultrafiltration membrane adhering to its support. Its flux and rejection to dyestuff of formula (3) (1500 ppm) is 231 $l/m^2.h$ and 74.3% at 10 bars. After modification, as in Example 1, with the difference of the immersion in polyethyleneimine for 10 minutes instead of 5 minutes, the flux and rejections of the modified membrane to dyestuff of formula (3) (1500 ppm) at 10 bars is 60 $l/m^2.h$ and 98%, respectively.

(b) As in (a) using the dye of formula (12) instead of the dye of formula (5) under the same conditions. The membrane's flux and rejection to dyestuff of formula (3) (1500 ppm) at 10 bars are 60 $l/m^2.h$ and 97.4%, respectively.

(c) As in (a) using the dye of formula (13) instead of reactive dyestuff of formula (5). The membrane's flux and rejection to dyestuff of formula (3) (1500) at 10 bars are 12.4 $l/m^2.h$ and 98.0%, respectively.

(d) As in (a) using the dye of formula (18) instead of reactive dye of the formula (5). The reactive ionic compound is used as a 2% aqueous solution at pH 9.0 for 10 minutes, contact with the membrane. The resultant membrane has a flux and rejection to dyestuff of the formula (3) (1500 ppm) of 34 $l/m^2.h$ and 99%, respectively, at 10 bars.

(e) As in (a) using the dye of formula (17) instead of dyestuff formula (5), under the same reaction conditions. The membrane's flux and rejection to dyestuff of formula (3) (1500 ppm) at 10 bars are 40 $l/m^2.h$ and 98,5%, respectively.

(f) As in (a) using the dye of formula (16) instead of dyestuff of formula (5) under the same conditions. The resultant membrane's flux and rejection at 10 bars are 25 $l/m^2.h$ and 99.2%, respectively.

EXAMPLE 21

Example 20(a) is repeated with the exception that the acrylonitrile polymer is an acrylonitrile/methallylsulfonate (sodium salt) (ratio 90/10) copolymer and the solvent is N-methyl pyrrolidone. Prior to modification as in Example 20(a), the flux and rejection to dyestuff of formula (3) (1500 ppm, 10 bars) are 57.1 $l/m^2.h$ and 33.8%, respectively; after modification: 51.8 $l/m^2.h$ and 99.7%, respectively.

EXAMPLE 22

Example 20(a) is repeated and modified according to the procedure of example 13 with the substitution of 2,4,6-trifluoro-5-chloropyrimidine for tetrachloropyrimidine (reaction of the fluoropyrimidine and membrane taking place at 10° C. for 10 minutes and with the polymer at 35° C. for 15 minutes). The resultant membrane has a flux and rejection to dyestuff of formula (3) (1500 ppm) of 40 $l/m^2/h$ and 98%, respectively.

EXAMPLE 23

(a) 9.0 grams of a copolymer of acrylonitrile-vinyl acetate (92% acrylonitrile and 8% vinyl acetate) are dissolved in 51 grams of dimethylformamide (DMF). After dissolution, the polymer solution is heated to 75° C. and 3.6 grams hydroxylamine hydrochloride ($NH_2OH.HCl$) and 2.5 grams sodium carbonate are added, and the solution is maintained at 75° C. for an additional 3 hours.

The solution suspension is cooled to room temperature and filtered to remove the undissolved sodium carbonate. The resultant solution is left to stand to get rid of air bubbles prior to casting. A sheet of a polyester non-woven support is adhered under slight tension at its ends with a pressure adhesive tape. The casting solution is then poured onto one end and cast with a casting bar at a wet film thickness of 0.20 mm. The resultant wet film is immersed in a bath of deionized water at ambient conditions, resulting in a water-insoluble ultrafiltration membrane on the non-woven support to which it adheres. Its flux and rejection properties are given in Table 14 for flat sheets under column "Before modification" of cast membrane.

This membrane is then modified further by immersing it in a 2% solution of cyanuric chloride at pH 9-10 and 0° C. for ½ hour. The membrane is washed for ½ hour in cold water, and immersed in a 10% solution of polyethyleneimine of average molecular weight of 30 000 at pH 8.5 for 10 minutes, then washed in tap water for 1 hour and immersed in a solution of 1% dye of formula (8) with 10% NaCl for 15 minutes at ambient conditions. The membrane is removed and immersed in another solution of 2% $Na_2CO_3$ at ambient conditions for 30 minutes, after which it is rinsed with tap water to remove the $Na_2CO_3$. The good flux and rejection properties are given in Table 14 for flat sheets in the column "after modification". Operation pressure is 10 bars.

(b) The same good results are obtained when using as starting material an acrylonitrile/acrylic acid-(90/10)-copolymer.

(c) As in (a) but using N-methyl pyrrolidone instead of DMF as the casting solvent.

(d) As in (a) but casting the membrane on a glass plate instead of a porous support.

(e) As in (c) using hexamethylol melamine (10% solution at pH 8–10) instead of cyanuric chloride. The flux and rejection of 1500 ppm of the dyestuff of formula (3), before and after modification, are 65 l/m$^2$.h and 42% vs 60 l/m$^2$.h and 94%, respectively. The hexamethylol melamine was synthesized according to the procedure of U.S. Pat. No. 2,328,592.

(f) As in (c) with the difference that the aqueous cyanuric chloride suspension is replaced by a 10% dioxane solution of phenylene-1,4-diisothiocyanate with immersion time of 5 minutes instead of 30 minutes. The step of polyethyleneimine (M.W. 30.000) is carried out for 1 hour instead of 10 minutes and with a 20% (instead of 10%) solution.

The resultant membrane is insoluble in N,N-dimethyl formamide and N-methyl-pyrrolidone-(2). The flux and rejection of the modified membranes to the dye of formula (3) (1500 ppm), at 20 bars are 61 l/m$^2$.h and 96%, respectively, while the unmodified membrane has a flux and rejection of 94 l/m$^2$.h and 50%, respectively.

(g) Example (f) is repeated, using a 2% dioxane solution of toluene-2,4-diisocyanate instead of phenylene-1,4-diisothiocyanate. The resultant membrane is insoluble in N,N-dimethyl-formamide, and has a flux and rejection of 11 l/m$^2$.h and 86%, respectively, to the dye of formula (3), 1500 ppm at 20 bars.

Immediately after casting the membrane is soluble in dimethyl formamide (DMF). After the first step of the modification the membrane is insoluble in DMF. This insolubilization is indicative of crosslinking which is known to improve compaction stability of reverse osmosis (RO) and ultrafiltration (UF) membranes.

TABLE 14

| Solute | Concentration in % | Before modification Flux in l/m$^2$·h | Before modification Rejection in % | After modification Flux in l/m$^2$·h | After modification Rejection in % |
|---|---|---|---|---|---|
| NaCl | 1.0 | 146 | 8 | 82 | 18 |
| CaCl$_2$ | 1.0 | 150 | 17 | 79 | 53 |
| Na$_2$SO$_4$ | 1.0 | 210 | 33 | 75 | 60 |
| Toluene sulfonic acid | 1.0 | 200 | 4.2 | 64 | 68 |
| Sucrose | 1.0 | 180 | 3.0 | — | — |
| Dye of the formula (2) | 0.15 | 130 | 50 | 50 | 99.8 |
| Dye of the formula (3) | 0.15 | 120 | 68 | 45 | 99.9 |
| Dye of the formula (4) | 0.15 | 110 | 54 | 53 | 99.6 |
| Dye of the formula (5) | 0.15 | 122 | 65 | 42 | 98.4 |
| (b) Dye of the formula (2) | 0.15 | — | — | 60 | 99.6 |
| (c) Dye of the formula (2) | 0.15 | — | — | 110 | 99.5 |
| (d) Dye of the formula (2) | 0.15 | — | — | 160 | 99.0 |

EXAMPLE 24

Example 23 (a) is repeated using, instead of the copolymer of acrylonitrile/vinyl acetate, a tripolymer of acrylonitrile (68–74%), butadiene (6–7%) and methylacrylate (21–25%). The flux and rejection properties of flat sheets are shown in Table 15.

TABLE 15

| Solute | Concentration in % | Before modification Flux in l/m$^2$·h | Before modification Rejection in % | After modification Flux in 1 m$^2$·h | After modification Rejection in % |
|---|---|---|---|---|---|
| NaCl | 1.0 | 250 | 4.0 | 43.6 | 23 |
| Dye of the formula (2) | 1.5 | 190 | 28 | 22.2 | 97 |
| Dye of the formula (2) | 0.15 | 250 | 30 | 35.0 | 97.6 |
| Dye of the formula (3) | 1.5 | 183 | 36 | 34 | 99.7 |
| Dye of the formula (5) | 1.5 | 172 | 45 | 31 | 99.6 |

The modified membrane has operated with 0.15% of the dye of formula (2) at 10 bars pressure for 100 hours with constant flux (30 l/m$^2$.h).

EXAMPLE 25

Example 23 (a) is repeated by casting in a non-woven tube (inner diameter 1.2 cm) with a bob of diameter of 1.1 cm with the same solution of Example 23 (a). The bob is placed on the bottom portion of the tube and the remainder of the tube was filled with casting solution. The tube is then allowed to fall past the bob into a bath of ice water. The coated tube is then modified as in Example 23 (a), and gives a membrane with a rejection and flux to the dye of formula (2) (15 000 ppm) of 99.3% and 35 l/m$^2$.h at 15 bars.

EXAMPLE 26

Example 23 (a) is repeated, but the reaction step of hydroxylamine is performed for different times.

TABLE 16

| Time of reaction (h) | Rejection in % | Flux in l/m$^2$·h | Pressure (bar) | Solute (%) |
|---|---|---|---|---|
| 1.0 | 99.74 | 89 | 10 | } dyestuff of formula (2)-0.15% |
| 2.0 | 99.90 | 105 | 10 | |
| 3.0 | 99.98 | 80 | 10 | |
| 3.0 | 10.4 | 120 | 10 | } NaCl-1% |
| 3.0 | 16.1 | 169 | 20 | |
| 3.0 | 19 | 228 | 30 | |
| 3.0 | 16.3 | 340 | 40 | |

EXAMPLE 27

A membrane of an acrylonitrile-methallylsulfonate (sodium salt) (90/10)-copolymer is prepared and modified as in Example 23 (a), with the change that N-methylpyrolidone was used instead of dimethylformamide. The supported membrane has, before modification a flux and rejection to dyestuff of the formula (2) (1500 ppm) at 10 bars, of 66 l/m$^2$.h and 42%, respectively; after modification: 50 l/m$^2$.h and 99.6%, respectively.

EXAMPLE 28

(a) 17.40 g of an acrylonitrile-vinyl acetate copolymer are dissolved in 100 ml of N-methyl-pyrrolidone at room temperature. To this solution 6.0 g of hydroxylamine hydrochloride and 4.4 g of sodium carbonate are added and the solution is heated to 75° C. and kept there for 3 hours. Upon cooling, the solution was filtered through a paper filter.

10 g of the above solution are cooled to 0°–5° C., and 300 mg of cyanuric chloride are added; the solution is stirred for 30 minutes at the same temperature. The solution was then left to stand in order to remove the bubbles, and is then cast with a casting knife of 0.20 mm clearance upon a polyester non-woven support. The membrane is then immersed in water for 1 hour. The resultant membrane is modified further by immersion in a 10% polyethyleneimine (M.W. 30,000) solution at pH 8.5, at room temperature for 15 minutes. The membrane is rinsed with water and dyed as in Example 23 (a). The resultant membrane is insoluble in N-methylpyrrolidone and DMF, and has a flux and rejection to the dyestuff of the formula (2) (1500 ppm) at 10 bars of 120 $l/m^2.h$ and 95%, respectively. A membrane made from the same copolymer of acrylonitrile-vinyl acetate without modification in solution or on the membrane, has a flux and rejection to the same dye solution under identical test conditions, of 400 $l/m^2.h$ and 57%, respectively.

(b) As (a), with the difference that $LiNO_3$ (4% w/v) is added to the casting solution and dissolved by heating. To cast, the solution is heated to 60° C. and cast 0.1 mm on the support. The cast membrane is immersed immediately in water. Before modification on the membrane, its flux and rejection to the dye of formula (3) (1500 ppm, 10 bars) are 700 $l/m^2.h$ and 20%, respectively. After modification, the flux and rejection are: 56 $l/m^2.h$ and 98%, respectively.

EXAMPLE 29

Example 28 (a) is repeated, with the difference that the cast membrane is gelled, not in water, but in a solution of 10% polyethyleneimine (M.W. 30,000) at room temperature, and kept in this solution for 15 minutes. The membrane is then dyed as in Example 23 (a). The resultant membrane has a flux and rejection of 106 $l/m^2.h$ and 98% for dyestuff of the formula (2) (1500 ppm) at 10 bars. The membrane is also insoluble in N-methylpyrrolidone.

EXAMPLE 30

Example 29 is repeated, with the difference that 150 mg of cyanuric chloride is added, instead of 300 mg. The resulting flux and rejection are 100 $l/m^2.h$ and 98% under identical test conditions with the dyestuff of formula (2).

EXAMPLE 31

A 23% solution (w/v) of a tri-polymer of acrylonitrile (68–74%), butadiene (6–7%), methyl-methacrylate (21–25%), in dimethylacetamid is prepared and filtered through a paper filter and cast on a support and modified as in Example 20 (a). Before modification, the membrane's rejection and flux to 1500 ppm of the dye of formula (3) are 50% and 190 $l/m^2/h$, respectively, at 10 bars; after modification they are 98.6% and 10 $l/m^2/h$, respectively.

EXAMPLE 32

Polyacrylonitrile homopolymer, synthesized by emulsion polymerization (W. R. Sorensen and T. W. Campbell, Preparative Methods of Polymer Chemistry, 2nd Edition, Interscience Publishers, 1968, p. 236) is dissolved in N,N-dimethyl-formamide and filtered to make a 10% solution. The subsequent casting support and modification procedure is as in Example 20 (a). Before modification, the membrane's rejection and flux are 75% and 271 $l/m^2/h$, respectively; after modification, they are 95% and 120 $l/m^2/h$, respectively at 10 bars and 1500 ppm of the dye of formula (3).

EXAMPLE 33

A membrane as in Example 20 (a) is cast, with the difference that N-methyl pyrrolidone is used instead of dimethyl formamide in the casting solution, and the membrane is immersed in ice water instead of in water at ambient conditions. It has an average pore size of 18 Å and a rejection and flux to dyestuff of formula (3) (1500 ppm) of 85% and 120 $l/m^2.h$, at 10 bars. It is modified as in Example 11, with the following differences: The step of hydroxylamine is carried out for 10 minutes at 50° C., and the polyethyleneimine is replaced with polyvinyl amine (M.W. 50,000–160,000), 10% aqueous solution at pH 9–10. The membrane is immersed in this solution for 15 minutes at room temperature. The dyeing step is as in Example 1. The modified membrane has a rejection and flux to the said dyestuff of formula (3) of 97% and 112 $l/m^2.h$, respectively.

EXAMPLE 34

Example 33 is repeated with the following change: Instead of polyvinylamine, polyvinylamine/vinyl sulfonate, sodium salt (60/40, M.W. 20,000–80,000). A 10% aqueous solution of the said polymer is reacted with the membrane after the step of cyanuric chloride for 2 hours at room temperature and pH 9–10. Because the said polymer contains ionic sulfonate groups, the dyeing step (d) is not carried out. The resultant, modified membrane has a rejection and flux to the dyestuff of the formula (3) of 97% and 102 $l/m^2.h$, at 10 bars.

EXAMPLE 35

Higher rejections to the same solutes are achieved when the modification is carried out under the same concentration of reagents as in Example 1, but with the following changes in temperature and/or time: the hydroxylamine step is at 71° C. for 15 minutes, the cyanuric chloride step is for 5 minutes at 0° C., the polyethyleneimine step is for 5 minutes, and the dye step is unchanged. Thus an unmodified membrane with a cut off above 70,000 is modified to a membrane with a cut off of 250 (see Table 17 where 4-nitrotoluene-2-sulfonic acid, M.W. 216, has a rejection of 94.5%. Before modification, the rejection was 9.8%). Test conditions: room temperature and 20 bars.

TABLE 17

| Solute | Concentration in % | Before modification | | After modification | |
|---|---|---|---|---|---|
| | | Flux in $l/m^2 \cdot h$ | Rejection in % | Flux in $l/m^2 \cdot h$ | Rejection in % |
| NaCl | 1.0 | 284 | 2.17 | 50 | 39 |
| $CaCl_2$ | 1.0 | 192 | 4.4 | 36 | 76 |
| $NaSO_4$ | 1.0 | 224 | 32 | 40 | 84 |
| Sodium dodecyl sulfate | 1.0 | 139 | 71 | 26 | 92 |
| 4-nitro toluene-2-sulfonic acid | 1.0 | 373 | 9.8 | 28.2 | 94.2 |

EXAMPLE 36

(a) 10 g of a copolymer of acrylonitrile-vinyl acetate (93:7) are dissolved in 75 g of N-methyl pyrrolidone. To this is added 15 g of hydroxylamine hydrochloride and 12 g of sodium carbonate. The mixture is heated for 4 hours at 75° C. with stirring. The solution is filtered and cast on a non-woven support, as in Example 23 (a).

Immediately after casting, the wet membrane is placed in a bath of ice water for 4 hours. The flux and rejection to 1500 ppm of the dye of formula (3) at 10 bars are 87 l/m².h and 30%, respectively. After modification as in Example 23 (a) the flux and rejection are 80 l/m².h and 94%, respectively.

(b) As in (a), but instead of using polyethyleneimine in the modification step, 10% polyvinylaniline (M.W. 20,000) solution at pH 10.0, for 1.0 hour at room temperature, is used. The flux and rejection to the dye of formula (3), 1500 ppm, at 10 bar after modification are 64 l/m².h and 86%, respectively. The flux and rejection of the unmodified membrane are as in (a).

(c) As in (b) but using a vinylaniline-styrene sulfonate (sodium salt) (40/60, M.W. 100,000)-copolymer instead of polyvinylaniline. The flux and rejection to the dye of formula (3), 1500 ppm, at 10 bars, are 30 l/m².h and 84%, respectively.

We claim:

1. A porous, modified polyacrylonitrile-containing semipermeable membrane having a structure suitable for ultra-filtration and reverse osmosis, which comprises a membrane of a polymer selected from the group consisting of polyacrylonitrile and copolymers of acrylonitrile and other ethylenically unsaturated monomers, said membrane having a surface which has pores with a diameter of 10 to 1000 Å before modification and being modified through a sequence of chemical reactions consisting essentially of steps (a) to (d), wherein:

step (a) is reacting said polymer with hydroxylamine, to form amidoxime groups;

step (b) is reacting the amidoxime groups obtained according to step (a) with an organic compound which contains at least two functional groups, at least one of which is capable of reacting with amidoxime groups, to bond one of the functional groups of the organic compound to the amidoxime groups, said organic compound being selected from the group consisting of
    compounds containing multiple bonds,
    compounds containing as reactive groups epoxide, aziridine, aldehyde, imidate, isocyanate, isothiocyanate, hydroxyl, anhydride, acyl halide or N-methylol groups, said reactive groups being substituted or unsubstituted,
    compounds containing substituents detachable as tertiary amines, and
    compounds containing substituents detachable as anions;

optional step (c) is reacting a polymer obtained according to step (b) with at least one polyfunctional, linear or branched oligomer or polymer having a plurality of functional groups, to bond an available functional group of the organic compound to one of the functional groups of the oligomer or polymer; and step (d) is reacting a polymer obtained according to step (b) or optional step (c) with a compound containing at least one ionizable group and at least one group capable of reaction with the polymer obtained according to step (b) or optional step (c), provided that a polymer obtained according to step (c) does not already possess sufficient ionic groups, to bond said compound containing said at least one ionizable group to the polymer obtained according to step (b) or optional step (c).

2. A membrane according to claim 1, wherein said membrane contains at least 5% by weight acrylonitrile units.

3. A membrane according to claim 1, wherein said membrane contains at least 30% by weight acrylonitrile units.

4. A membrane according to claim 1, wherein the membrane contains copolymers of acrylonitrile and a comonomer selected from the group consisting of vinyl acetate, vinyl ethers, vinyl pyridine, vinyl chloride, styrene, butadiene, acrylic acid, methacrylic acid, acrylates, methacrylates, maleic anhydride, 2-aminoethyl methacrylate, allyl compounds, terpolymers and tetrapolymers based on acrylonitrile, and mixtures thereof.

5. A membrane according to claim 1, wherein said organic compound is a compound selected from the group consisting of a cyclic carbonic acid imide-halide and compounds containing at least one isocyanate, isothiocyanate or N-methylol group.

6. A membrane according to claim 5, wherein said organic compound is a compound selected from the group consisting of halogeno-diazines and -triazines which contain at least 2 reactive substituents.

7. A membrane according to claim 5, wherein said organic compound is a compound selected from the group consisting of cyanuric halides, trihalopyrimidines and tetrahalopyrimidines.

8. A membrane according to claim 5, wherein said organic compound is a compound selected from the group consisting of cyanuric chloride and tetrachloropyrimidine.

9. A membrane according to claim 5, wherein said organic compound is a compound selected from the group consisting of alkylene-diisocyanates of 2 to 4 carbon atoms in the alkylene moiety, phenylene- or alkyl-substituted phenylene diisocyanates and phenylenediisothiocyanates.

10. A membrane according to claim 1, wherein said oligomer or polymer contains groups selected from the group consisting of aliphatic or aromatic amino groups, hydroxyl groups and thiol groups.

11. A membrane according to claim 10, wherein said oligomer or polymer is a compound selected from the group consisting of polyethyleneimines, polyvinyl alcohols, cellulose derivatives, polyvinylamines and polyvinylanilines.

12. A membrane according to claim 10, wherein said oligomer or polymer comprises copolymers selected from the group consisting of the sodium salt of styrene-sulfonic acid and vinylaniline, 2-aminoethyl methacrylate and acrylic acid, vinylaniline and vinylbenzyltrimethylammonium chloride and a copolymer of vinylamine and vinylsulfonate.

13. A membrane according to claim 1, wherein the ionizable group-containing compound is a compound containing ionizable groups selected from the group consisting of sulfonic acid, carboxylic acid and ammonium groups.

14. A membrane according to claim 13, wherein the ionizable group-containing compound is a reactive azo dye containing ionizable groups.

15. A membrane according to claim 14, wherein the ionizable group-containing compound is a reactive azo dyestuff containing sulphonic acid or carboxyl groups and reactive groups selected from the group consisting of monochlorotriazinyl, dichlorotriazinyl, 2,4-dichloropyrimidinyl, vinylsulphonyl, β-sulfatoethylsulfonyl, β-chloroethylsulfonyl and β-sulfatoethylaminosulfonyl radicals.

16. A process for concentrating a solution with a solute which comprises disposing on one side of a semipermeable membrane according to claim 1 a solution with a solute, said solution having an osmotic pressure, and applying a hydraulic pressure against said solution and said membrane, said pressure being greater than the osmotic pressure of said solution.

17. A process for purifying a solution with a solute which comprises disposing on one side of a semipermeable membrane according to claim 1 a solution with a solute, said solution having an osmotic pressure, and applying a hydraulic pressure against said solution and said membrane, said pressure being greater than the osmotic pressure of said solution.

18. A process for separating components dissolved in a solution which comprises disposing on one side of a semipermeable membrane according to claim 1 a solution with a solute, said solution having an osmotic pressure, and applying a hydraulic pressure against said solution and said membrane, said pressure being greater than the osmotic pressure of said solution.

* * * * *